United States Patent [19]

Maloomian

[11] Patent Number: 4,486,774
[45] Date of Patent: * Dec. 4, 1984

[54] SYSTEM AND METHOD FOR COMPOSITE DISPLAY

[76] Inventor: Laurence G. Maloomian, 28 Crystal Hill, Westwood, Mass. 02090

[*] Notice: The portion of the term of this patent subsequent to Aug. 21, 2001 has been disclaimed.

[21] Appl. No.: 466,973

[22] Filed: Feb. 16, 1983

Related U.S. Application Data

[63] Continuation-in-part of Ser. No. 366,372.

[51] Int. Cl.³ .............................................. H04N 7/18
[52] U.S. Cl. ................................... 358/93; 358/183
[58] Field of Search .............. 358/93, 107, 180, 181, 358/183; 353/28

[56] References Cited

U.S. PATENT DOCUMENTS

| | | |
|---|---|---|
| 1,133,311 | 3/1915 | Newcomb . |
| 2,722,600 | 11/1955 | Forbes . |
| 2,730,565 | 1/1956 | Owens ................................ 358/183 |
| 3,398,664 | 8/1968 | Bonatsos ............................... 358/97 |
| 3,507,570 | 4/1970 | Bourdier ............................... 353/28 |
| 3,576,945 | 5/1971 | Ebeling ................................. 358/93 |
| 3,849,596 | 11/1974 | Lawrence ............................. 358/93 |
| 4,232,334 | 11/1980 | Dyson ................................. 358/107 |
| 4,261,012 | 4/1981 | Maloomian ........................... 358/93 |

Primary Examiner—Howard W. Britton
Attorney, Agent, or Firm—Thompson, Birch, Gauthier & Samuels

[57] ABSTRACT

As apparatus to allow a prospective consumer of articles of clothing to try on one or more articles of clothing without actually putting the articles of clothing on his or her person. This is accomplished by means of an electronically produced full figure image which is composed of the consumer's head and a model's body, the model's body attired in articles of clothing to be presented. The composite image is viewed by the consumer on a television screen and this gives the effect of the consumer being attaired in the articles of clothing presented.

7 Claims, 3 Drawing Figures

SYSTEM AND METHOD FOR COMPOSITE DISPLAY

CROSS REFERENCE TO RELATED APPLICATION

This application is a continuation-in-part of an earlier filed application of the same title, Ser. No. 366,372 filed Apr. 7, 1982.

BACKGROUND AND BRIEF SUMMARY OF THE INVENTION

The invention disclosed herein is an improvement of my prior invention, U.S. Pat. No. 4,261,012, issued April, 1981. The prior art discussed in that patent is still considered to be the most relevant prior art.

This invention relates to a system of the type enabling a suject using the system to view a composite picture showing part of the subject himself (or herself) together with some separate article or object as though the subject were actually wearing such article. For instance, such a system when used in ladies bridal salon, might allow a customer to sample the effects of various wedding gowns and choose the most becoming one without actually having to try them on.

Systems of this general kind have already been proposed and have utilized various optical expedients for producing the composite picture. However, none of such prior art devices so far as known to applicant, have been entirely satisfactory.

Perhaps the simplest type of system used employs a semi-transparent mirror positioned before the subject, with means for positioning the actual articles to be displayed, at a suitable position behind the mirror, so that a subject when looking at the semi-transparent mirror will see the reflected image of his or her face or figure, together with the article, as seen by transparency through the semi-transparent mirror so that it will appear to be naturally joined with the reflected image. Systems of this kind are advantageously simply, but have the serious drawback that they require a large number of articles, samples or models to be physically present, and the system will in many instances involve a prohibited amount of storage space.

Other composite display systems have accordingly been proposed in which these difficulties are eliminated through the use of projection slides for displaying the images of the articles in the composite pictures, thereby dispensing with the need, for a physical presence of the actual articles. Slides of course are much easier to store in large numbers and more convenient to manipulate, than are the articles themselves.

Another system requires a black draped subject looking through a semi-transparent mirror, the reflection of her own face in the mirror is formed on the plane of a screen, together with the projected image of a slide formed by a projector on the screen. The slides represent headless models wearing different articles of clothing whereby the subject appears to see composite pictures of herself as though wearing the articles.

Although this system will allow a full figure composite image, it does so under conditions which are not entirely comfortable for the viewing subject, and has serious drawbacks. For the system to work, it must be used in a darkened room which many people find uncomfortable especially in the presence of strangers (salespeople/system operators). Further, the subject must sit with a black cape on her body from the neck down keeping her head fixed in a preset position so as not to misalign the composite image, additionally, there is an inherent inability to produce a composite image of dark or black skinned people. In producing the reflection of the viewer's face from the mirror, a black cape is used to black out the viewer's body below the neck, this ability of the mirror not to reflect the blacked out part of the viewer's body also makes it impossible for the mirror to reflect adequately a dark or black skinned face. Further, in order to have a common background for the composite image as seen in the mirror, the slides are photographed against a black background which will not allow a high quality (detail) reproduction in the slides of black articles of clothing. With this system, the operator attempts to correspond the body size of the projected image (model's body) to the viewer's body by means of a zoom lens on the projector. Inherently, a zoom lens will increase or decrease the size of its projected image proportionately in all directions. Therefore, with this apparatus, it is impossible to create a short fat image or a tall, thin image but rather only a short thin, tall fat or a well proportioned image in between which may or may not correspond with the viewer's own body. Another drawback of this system is the large amount of space it requires making its use impractical except in very large stores.

The prior art in this field is believed to be best represented by U.S. Pat. No. 1,133,311, wherein the subject's head and a garment are composed on a mirror; U.S. Pat. No. 2,722,600, superimposition of two separate images on a common screen; U.S. Pat. Nos. 2,730,565, and 3,576,945, composite pictures where background scenes are blended with a separate image; U.S. Pat. No. 3,398,664, directed to an automatic photoprocessor, and U.S. Pat. No. 3,849,596, directed to various techniques for using a television camera for automatic alignment of two images side-by-side.

None of the foregoing references teach a system which is compact, allows the customer to be photographed in an open area and allows the composite picture to be proportioned along at least one of two axes such that the image of the model's body can be adjusted to be proportioned to the customer's head.

My invention encompasses a composite display system which overcomes the difficulties of the prior art and which is convenient to use and operate, will enable a full figure, full sized display under comfortable conditions for the customer viewer, can be readily adjusted and operated by the system operator in order to view sequentially a series of composite full figure picture displays at a rate as fast or slow as desired.

My invention is broadly directed to a system for displaying to a customer, composite views including part of the customer together with the image of an article as though said article were actually associated with or worn by the customer, which system comprises means to record and display a portion of a body of a customer; means to store a plurality of images, which images when combined with the recorded portion of the customer will provide a full figure display; means to vary the dimensions of the stored image; means to combine and display the combined images.

The method of my invention of providing a proportioned full figure image which includes: displaying at least a portion of a customer on a medium, recording at least a portion of an article of clothing on a medium, combining the images to produce a full figure image, scaling of one of the images with respect to the other to provide a proportional full figured composite image.

The present invention as with the prior invention overcomes the prior art problems discussed therein and, further, this invention has the following advantages or improvements over my prior invention, namely, there is greater flexibility in scaling the height and width of the customer's body. That is, the whole X and/or Y and/or any portion or different portions of the X and/or Y can be scaled. The present invention, is not necessarily limited to making the subject's body taller or shorter, fatter or thinner; the model's body which originally modeled the garment can be scaled to the customer's overall measurements. Perferably, this is accomplished by stretching and/or shrinking rasters, horizontally and/or vertically, based on a calculated stretch and/or shrink factor. For example, I can scale the model which is stored in memory to the bust, hip, waist, and height measurements of the customer. A further improvement is that the skin tone of the model can be adjusted to more nearly simulate the skin tone of the customer.

In the preferred embodiment the system comprises a video camera, a frame grabber, a CPU, an image buffer, a memory, and a television monitor. The videocamera takes the image of the customer which is digitized by and stored in the frame grabber and ultimately displayed on a video screen. Pre-recorded articles of clothing to be combined with the image of the customer are stored. Through use of the central processing unit, at least one of the images, preferably that of the article of clothing are varied at least along horizontal and vertical axes to provide a proportioned full figured composite.

DESCRIPTION OF THE PREFERRED EMBODIMENT

Figure 1:
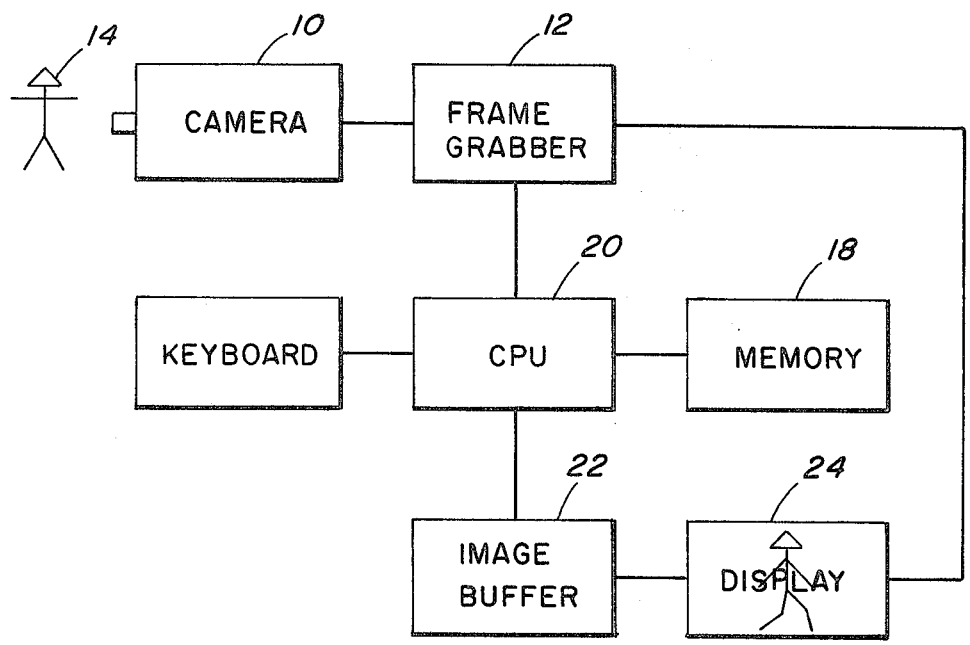
FIG. 1 is a block and pictorial diagram representing the preferred embodiment of my invention.

Referring to FIG. 1, television camera or video camera 10, such as a JVC Model KY 1900 CH communicates with a frame grabber 12, such as a DATACUBE 150. The camera 10 records the customer 14 to provide a first image 16; see FIG. 2a.

Various articles of clothing are modeled to provide second images. The images are coded and stored in a memory 18, such as a DSD 880; via a CPU 20, such as a DEC LSI-11/23. As many recordings of various articles of clothing as desired are taken and stored in sequence in the memory 18. The second images from the memory 20 are input to an image buffer 22 such as a DATACUBE 150. The image in the image buffer is scaled and the output is displayed on a video screen 24.

The control of the computer 20 is accomplished through instructions. The instructions are written in terms of the particular mode of operation desired. The computer thus has stored in its memory the programs or routines corresponding to each mode or operation of the computer. It is well known to those skilled in the art, that the computer comprises suitable controls, storage and computational units for performing the various arithmatic and logical functions on data which it processes in digital form. Any standard computer can be used for the instructions. The routines are not described in detail, since they can be written in any desired notations, formats or sequences, depending upon the particular program being utilized, computer language, etc. For the specific computer of the preferred embodiment, the manufacturer's handbook sets forth the necessary program which includes the sequence of internal interconnections which have been added by the preparation and loading of the program into the internal memory of the computer.

It will be only a rare instance when the view of the customer's head and neck will be proportional with the previously recorded view of the article of clothing modeled from the neck down. Therefore, the vertical and horizontal adjustments are necessary, as distinguished from those adjustments which are commonly found with a zoom lens. For example, the customer may be a size 16 and the model a size 8; preferably, horizontal and/or vertical rasters are scaled so that a true proportional full figure composite will be presented to the viewer-customer.

With the above system, it is clear it is not dependent on black in either the background or as a means of eliminating any portion of the customer's body below the neck. Further, this system can be viewed under normal interior lighting conditions much the same as home television viewing thereby providing for more comfortable environment for both the customer and the salesperson. Also, once the customer's image has been recorded by the video camera, the customer is free to assume any position or location comfortable and convenient for viewing the display screen. Still further, because there is no need to record or photograph the articles of clothing against a black background the clothing can be shown against backgrounds which enhance the color of the clothing. In this regard, the system is so designed could allow the composite image to be superimposed over a background which would be a natural setting for the use of the clothing displayed, like an evening gown displayed over the background of a formal ballroom, such as employing the techniques disclosed in U.S. Pat. No. 3,576,945. Lastly, although all of the components have been shown in block diagram form, all components may be housed in a single cabinet which requires only a few square feet of floor space, will need no special areas or darkened rooms and can be placed anywhere convenient for its use in any sized department or store.

Referring to FIG. 2, in the operation of the invention, after all components are actuated a memory of articles or second images 26 is created. This is accomplished by use of the T.V. camera and the frame grabber and the images are stored in memory. The video signals from the T.V., camera are grabbed by the frame grabber 12. The image in the frame is composed of horizontal lines of information called 'rasters'. There is one image for each article of clothing and each image is in color. Each image is coded and stored in memory 18 raster by raster. Also, the clothing size of the second image is identified (coded) as a standard. Further, each image stored in the memory is the same size top to bottom.

Figure 2A:
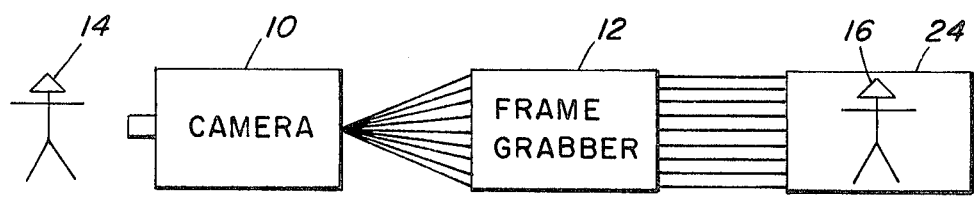
FIGS. 2a and 2b are schematics illustrating the composite on a screen.

The customer 16 then is viewed by the color T.V. camera 10; see FIG. 2a. The customer's clothes size is fed to the computer 20 and if the cutomer's size does not match the standard size the computer calculates a horizontal and/or vertical stretch and/or shrink factor to be applied to the stored images so that depending upon whether the customer's size is smaller or larger, the stored image may be proportioned properly to match with the customer's size. The customer selects an image, say a particular bridal gown and the coding information for this image is input into the computer. The image of the customer is displayed on the screen 24 and that portion below the client's neck (indexed at a specific raster location) may or may not be shown as originally photographed. The horizontal and/or vertical stretch and/or shrink factor is applied to the stored image on a raster by raster bias, and the stretched or squeezed result is fed to the display device 24, overriding the image of the client up to but not over the face at the specified raster location.

More particularly, the article of clothing chosen by the customer is read into the computer memory. Starting at the specified raster of the image (near the neck area), each raster is stretched and/or shrunk horizontally and/or vertically by the stretch and/or shrink factor, and a new raster calculated.

Two alternatives may be used in this step. First, a simple re-partitioning of the raster using fractions of pixels according to the stretch and/or shrink factor; or secondly, a low pass filtering and sampling according to the pixel spacing; preferably, two dimensional filtering (incorporating the rasters above and below the current raster) should contribute less distortion to the stretch image.

Figure 2B:
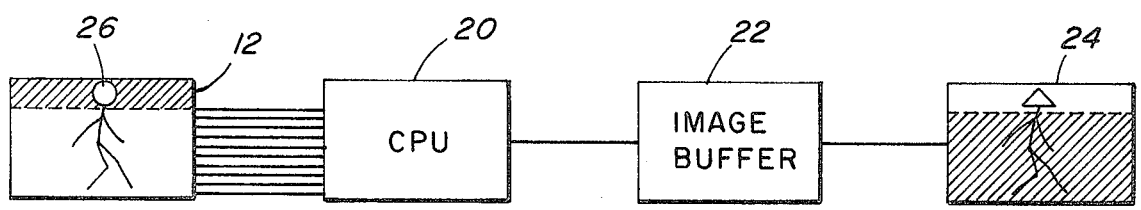

Each new computer raster is loaded into the display device on top of the customer image and the next rasters are computed in sequence until the composite image is complete as shown in FIG. 2b.

Alternatively, the first image can be input in digitized form into the image buffer and not initially displayed at 24. The second image is overlayed or combined electronically with the first image and the composite image is scanned out and displayed. A separate buffer may be used to store the first image and the images from both buffers combined and displayed.

Having described my invention, what I now claim is:

1. A system for displaying a full figure composite display of two separate images which comprises:
    means to record as a first image at least a portion of a customer's body;
    means to record as a second image at least a portion of clothing;
    means to store the second image;
    means to display at least a portion of the first image;
    means to determine if the stored image is proportional to the displayed portion of the first image;
    means to expand and/or shrink horizontally and/or vertically the second stored image by rasters;
    to vary the dimensions of the stored image and output the same, the dimensions varied based on the first image; and,
    means to display the stored image in combination with and contiguous to the displayed first image whereby a fully proportioned full figure composite is displayed.

2. The system of claim 1 wherein the means to record includes a video camera and wherein the means to store the second image includes means to store said image on a raster by raster basis.

3. The system of claim 1 which includes means to record a plurality of second images.

4. The system of claim 1 wherein the first image is a fixed image and the second image is one of a pluarlity of stored images and which includes means to display said first image with one of the plurality of second images in timed sequence.

5. A method for displaying a full figure composite display of two separate images which includes:
    recording as a first image at least a portion of a customer's body;
    recording as a second image at least a portion of clothing;
    storing the second image;
    displaying at least a portion of the first image;
    determining if the stored image is proportional to the displayed portion of the first image;
    expanding and/or shrinking, horizontally and/or vertically the second stored image by raster;
    to vary if required the dimensions of the stored image and outputting the same, the dimensions varied based on the size of the first image; and
    displaying the stored image in combination with and contiguous to the displayed first image whereby a fully proportioned full figure composite is displayed.

6. The method of claim 5 which includes
    digitizing the second image; and
    storing the second image in memory on a raster by raster basis.

7. The method of claim 5 which includes overlaying a portion of the first image with at least a portion of the second image on a raster by raster basis.

* * * * *